(12) United States Patent
Park et al.

(10) Patent No.: US 9,830,729 B2
(45) Date of Patent: Nov. 28, 2017

(54) GRAPHIC PROCESSING UNIT FOR IMAGE RENDERING, GRAPHIC PROCESSING SYSTEM INCLUDING THE SAME AND IMAGE RENDERING METHOD USING THE SAME

(71) Applicants: Yong-Ha Park, Seongnam-si (KR); Kil-Whan Lee, Seoul (KR)

(72) Inventors: Yong-Ha Park, Seongnam-si (KR); Kil-Whan Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 354 days.

(21) Appl. No.: 14/255,150

(22) Filed: Apr. 17, 2014

(65) Prior Publication Data

US 2014/0333620 A1    Nov. 13, 2014

(30) Foreign Application Priority Data

May 9, 2013 (KR) ........................ 10-2013-0052615

(51) Int. Cl.
*G06T 15/40* (2011.01)
*G06T 15/00* (2011.01)
*G06T 15/04* (2011.01)

(52) U.S. Cl.
CPC ............ *G06T 15/005* (2013.01); *G06T 15/04* (2013.01)

(58) Field of Classification Search
None
See application file for complete search history.

(56) References Cited

U.S. PATENT DOCUMENTS

| | | | | |
|---|---|---|---|---|
| 6,326,976 B1 * | 12/2001 | Huettner | ................ | G06T 15/04 345/581 |
| 6,426,747 B1 * | 7/2002 | Hoppe | ..................... | G06T 1/60 345/419 |
| 6,426,753 B1 | 7/2002 | Migdal | | |
| 6,433,789 B1 * | 8/2002 | Rosman | ................... | G06T 1/60 345/582 |
| 6,525,726 B1 * | 2/2003 | Xie | ........................ | G06T 15/40 345/421 |
| 6,629,188 B1 | 9/2003 | Minkin et al. | | |
| 6,717,577 B1 | 4/2004 | Cheng et al. | | |
| 6,850,644 B1 * | 2/2005 | Shin | ........................ | G06T 7/403 382/190 |
| 7,245,302 B1 * | 7/2007 | Donham | .................. | G06T 1/20 345/426 |
| 7,280,107 B2 | 10/2007 | Whitted et al. | | |

(Continued)

*Primary Examiner* — Anh-Tuan V Nguyen
(74) *Attorney, Agent, or Firm* — F. Chau & Associates, LLC

(57) ABSTRACT

A graphic processing unit, a graphic processing system comprising the same, and a rendering method using the same. The graphic processing unit includes a geometry processing unit configured to receive a vertex and to output a primitive and information about texture patches corresponding to the primitive using the vertex, and a rendering processing unit configured to convert the output primitive into a fragment and to perform fragment shading on the converted fragment, wherein the texture patch indexed by the texture patch information is pre-loaded to the rendering processing unit before the fragment shading is performed.

21 Claims, 15 Drawing Sheets

Premitive List

| | Position | Attribute | Texture Patch |
|---|---|---|---|
| Tile n | Ptr_Pa_P | Ptr_Pa_A | Ptr_TPa_Dsc |
| | Ptr_Pb_P | Ptr_Pb_A | Ptr_TPb_Dsc |
| | Ptr_Pc_P | Ptr_Pc_A | Ptr_TPc_Dsc |
| Tile (n+1) | : | : | : |
| | : | : | : |

(56) References Cited

U.S. PATENT DOCUMENTS

| | | | |
|---|---|---|---|
| 7,324,115 B2* | 1/2008 | Fraser | G06T 15/00 345/419 |
| 7,505,036 B1* | 3/2009 | Baldwin | G06T 15/503 345/419 |
| 7,551,178 B2 | 6/2009 | Chung et al. | |
| 7,688,320 B2 | 3/2010 | Shearer | |
| 7,999,819 B2 | 8/2011 | Liao et al. | |
| 8,089,486 B2 | 1/2012 | Anderson et al. | |
| 8,233,006 B2 | 7/2012 | Grossman et al. | |
| 8,611,695 B1* | 12/2013 | Han | G06K 9/00677 382/254 |
| 2001/0031103 A1* | 10/2001 | Kim | G06F 17/30262 382/305 |
| 2005/0017969 A1* | 1/2005 | Sen | G06T 15/04 345/419 |
| 2006/0209078 A1* | 9/2006 | Anderson | G06T 15/005 345/506 |
| 2007/0211070 A1* | 9/2007 | Stenson | G06T 15/04 345/587 |
| 2007/0237391 A1* | 10/2007 | Wu | G06T 11/001 382/166 |
| 2008/0024490 A1* | 1/2008 | Loop | G06T 15/40 345/421 |
| 2008/0074418 A1* | 3/2008 | Shearer | G06T 1/60 345/420 |
| 2009/0051687 A1* | 2/2009 | Kato | G06T 15/80 345/426 |
| 2009/0128575 A1* | 5/2009 | Liao | G06T 15/04 345/552 |
| 2009/0174721 A1* | 7/2009 | Sprangle | G06F 8/41 345/582 |
| 2009/0315908 A1* | 12/2009 | Comparan | G06T 15/04 345/582 |
| 2010/0315424 A1* | 12/2010 | Cai | G06T 7/0065 345/427 |
| 2011/0221743 A1* | 9/2011 | Keall | G06T 15/005 345/419 |
| 2011/0299743 A1* | 12/2011 | Ke | G06K 9/4676 382/118 |
| 2012/0106830 A1* | 5/2012 | Bama | G06T 7/402 382/154 |
| 2012/0169748 A1* | 7/2012 | Merrill | G06T 11/40 345/522 |
| 2012/0189221 A1 | 7/2012 | Inada et al. | |
| 2012/0212488 A1 | 8/2012 | Yu et al. | |
| 2013/0076761 A1* | 3/2013 | Ellis | G06F 15/16 345/502 |
| 2013/0093779 A1* | 4/2013 | Lyons | G09G 5/39 345/547 |
| 2013/0128056 A1* | 5/2013 | Chuang | H04N 5/2351 348/187 |
| 2013/0265298 A1* | 10/2013 | Moon | G06T 15/00 345/419 |
| 2014/0071150 A1* | 3/2014 | Fishwick | G06T 1/00 345/589 |
| 2014/0184606 A1* | 7/2014 | de Richebourg | G06T 1/60 345/440 |
| 2015/0317818 A1* | 11/2015 | Howson | G06T 15/005 345/424 |

* cited by examiner

Premitive List

| | Position | Attribute | Texture Patch |
|---|---|---|---|
| Tile n | Ptr_Pa_P | Ptr_Pa_A | Ptr_TPa_Dsc |
| | Ptr_Pb_P | Ptr_Pb_A | Ptr_TPb_Dsc |
| | Ptr_Pc_P | Ptr_Pc_A | Ptr_TPc_Dsc |
| Tile (n+1) | ⋮ | ⋮ | ⋮ |
| ⋮ | ⋮ | ⋮ | ⋮ |

FIG. 10

Premitive List

| | Position | Attribute | Texture Patch |
|---|---|---|---|
| Tile n | Ptr_Pa_P | Ptr_Pa_A | TPa Descriptor |
| | Ptr_Pb_P | Ptr_Pb_A | TPb Descriptor |
| | Ptr_Pc_P | Ptr_Pc_A | TPc Descriptor |
| Tile (n+1) | ⋮ | ⋮ | ⋮ |
| ⋮ | ⋮ | ⋮ | ⋮ |

GRAPHIC PROCESSING UNIT FOR IMAGE RENDERING, GRAPHIC PROCESSING SYSTEM INCLUDING THE SAME AND IMAGE RENDERING METHOD USING THE SAME

CROSS-REFERENCE TO RELATED APPLICATION

This application claims priority under 35 U.S.C. 119 to Korean Patent Application No. 10-2013-0052615 filed on May 9, 2013, the disclosure of which is incorporated by reference herein in its entirety.

TECHNICAL FIELD

The inventive concept relates to a graphic processing unit, a graphic processing system comprising the same, and a rendering method using the same.

DISCUSSION OF THE RELATED ART

Computer performance has rapidly developed, and a graphics processing system of a personal computer, a home video game computer, or a portable device can render highly realistic-looking graphic images. In such a graphic processing system, many image processing stages are performed preliminary to rendering graphic primitives on a screen of the computer system.

A graphics processing unit (GPU) is a core that can exclusively perform graphics operations in a computing system. A graphics pipeline is a hardware structure of the GPU having a three-dimensional (3D) object as an input and which may have a two-dimensional (2D) rendering image as an output. The recent increase in the graphic resolution may has increased the quantity of computational operations performed by the GPU in real time and has increased the required bandwidth of memory.

SUMMARY

An aspect of the inventive concept provides a graphic processing unit having improved processing performance.

An aspect of the inventive concept also provides a graphic processing system having improved processing performance.

An aspect of the inventive concept provides a rendering method using a graphic processing unit having improved processing performance.

These and other features of the inventive concept will be described in or be apparent from the following description of the preferred embodiments.

According to an aspect of the inventive concept, there is provided a graphic processing unit including a geometry processing unit receiving a vertex and outputting a primitive and information about texture patches corresponding to the primitive using the vertex, and a rendering processing unit converting the output primitive into a fragment and performing fragment shading on the converted fragment, wherein the texture patch indexed by the texture patch information is pre-loaded to the rendering processing unit before the fragment shading is performed.

According to an aspect of the inventive concept, there is provided a graphic processing system including a primitive assembly unit receiving a vertex and assembling a primitive using the vertex, a tiling unit dividing an image frame into a plurality of tiles and generating information about texture patches corresponding to primitives corresponding to the divided tiles, and a rendering processing unit performing fragment shading using information about the generated texture patches for the fragments included in the primitives.

According to an aspect of the inventive concept, there is provided a graphic processing system including a graphic processing unit performing rendering on an input; and an external memory used by the graphic processing unit to perform the rendering, wherein information about texture patches corresponding to primitives generated by the graphic processing unit is stored in the external memory, and the texture patches indexed by the texture patch information are pre-loaded to the graphic processing unit before the graphic processing unit performs fragment shading.

According to yet an aspect of the inventive concept, there is provided a rendering method including receiving a vertex, assembling a primitive using the vertex and defining a texture patch corresponding to the primitive; performing rasterization on the assembled primitive and converting the primitive into a fragment; and performing fragment shading on the fragment using the defined texture patch.

Features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. In the drawings, the thickness of layers and regions are exaggerated for clarity.

It will be understood that when an element or layer is referred to as "connected to" another element, it can be directly connected to the other element or intervening elements may be present. In contrast, when an element is referred to as being "directly connected to" another element, there are no intervening elements present. Like numbers refer to like elements throughout. As used herein, the term "and/or" includes any and all combinations of one or more of the associated listed items.

The use of the terms "a" and "an" and "the" and similar referents in the context of describing the invention (especially in the context of the following claims) are to be construed to cover both the singular and the plural, unless otherwise indicated herein or clearly contradicted by context. The terms "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the inventive concept.

The term "unit" or "module", as used herein, means, but is not limited to, a software or hardware component, such as a field programmable gate array (FPGA) or an application specific integrated circuit (ASIC), which performs certain tasks. A unit or module may advantageously be configured to reside in the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

BRIEF DESCRIPTION OF THE DRAWINGS

The above and other features of the inventive concept will become more apparent to persons skilled in the art by describing in detail preferred embodiments thereof with reference to the attached drawings in which:

FIG. 10 illustrates an exemplary list of primitives generated by a graphic processing unit according to an exemplary embodiment of the inventive concept;

DETAILED DESCRIPTION OF THE EXEMPLARY EMBODIMENTS

Hereinafter, a graphic processing unit according to an embodiment of the inventive concept will be described with reference to FIG. 1.

Figure 1:
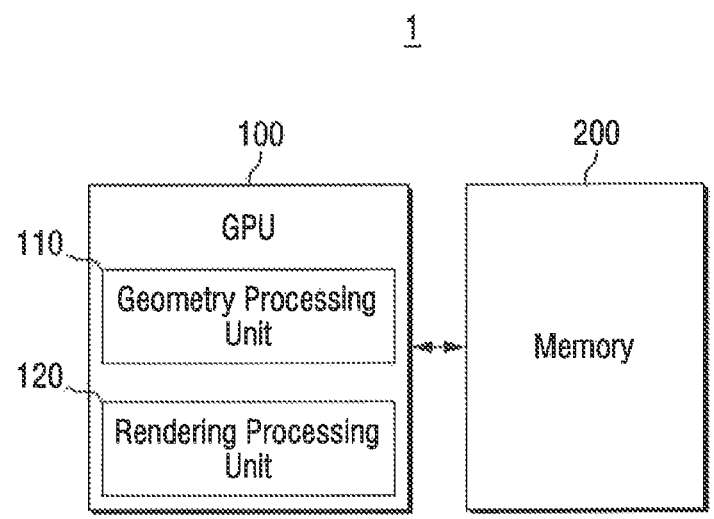
FIG. 1 is a block diagram of a graphic processing unit and memory according to some exemplary embodiments of the inventive concept.

FIG. 1 is a block diagram of a graphic processing unit according to some exemplary embodiments of the inventive concept.

Referring to FIG. 1, the computing system 1 according to an embodiment of the inventive concept includes a graphics processing unit (GPU) 100 and an external memory 200.

The GPU 100 according to an exemplary embodiment of the inventive concept may be configured to perform rendering of graphic primitives. The GPU 100 may be configured to perform tile-based rendering. To this end, the GPU 100 includes graphics pipeline components. The graphics pipeline may also be referred to as rendering pipeline. The graphics pipeline configuration may be capable of processing graphic data in a pipelined manner. The graphics pipeline configuration may be implemented by software or hardware.

The external memory 200 is used by the GPU 100 for performing rendering. The external memory 200 may be optimized to temporarily store data. The external memory 200 may store graphic data processed by the GPU 100 or provided to the GPU 100.

In addition, the external memory 200 can function as a working memory of the GPU 100. The external memory 200 can include one or more volatile memories, such as a double data rate static DRAM (DDR SDRAM) or a single data rate static DRAM (SDR SDRAM), and/or one or more nonvolatile memories, such as an electrical erasable programmable ROM (EEPROM), or a flash memory, but aspects of the inventive concept are not limited thereto.

The GPU 100 includes a geometry processing unit 110 and a rendering processing unit 120. In some exemplary implementations of the inventive concept, the geometry processing unit 110 and the rendering processing unit 120 may be configured to be driven using different processors, but the inventive concept is not limited thereto.

In some exemplary implementations of the inventive concept, the geometry processing unit 110 and the rendering processing unit 120 may be configured to be driven using a single processor.

Figure 2:
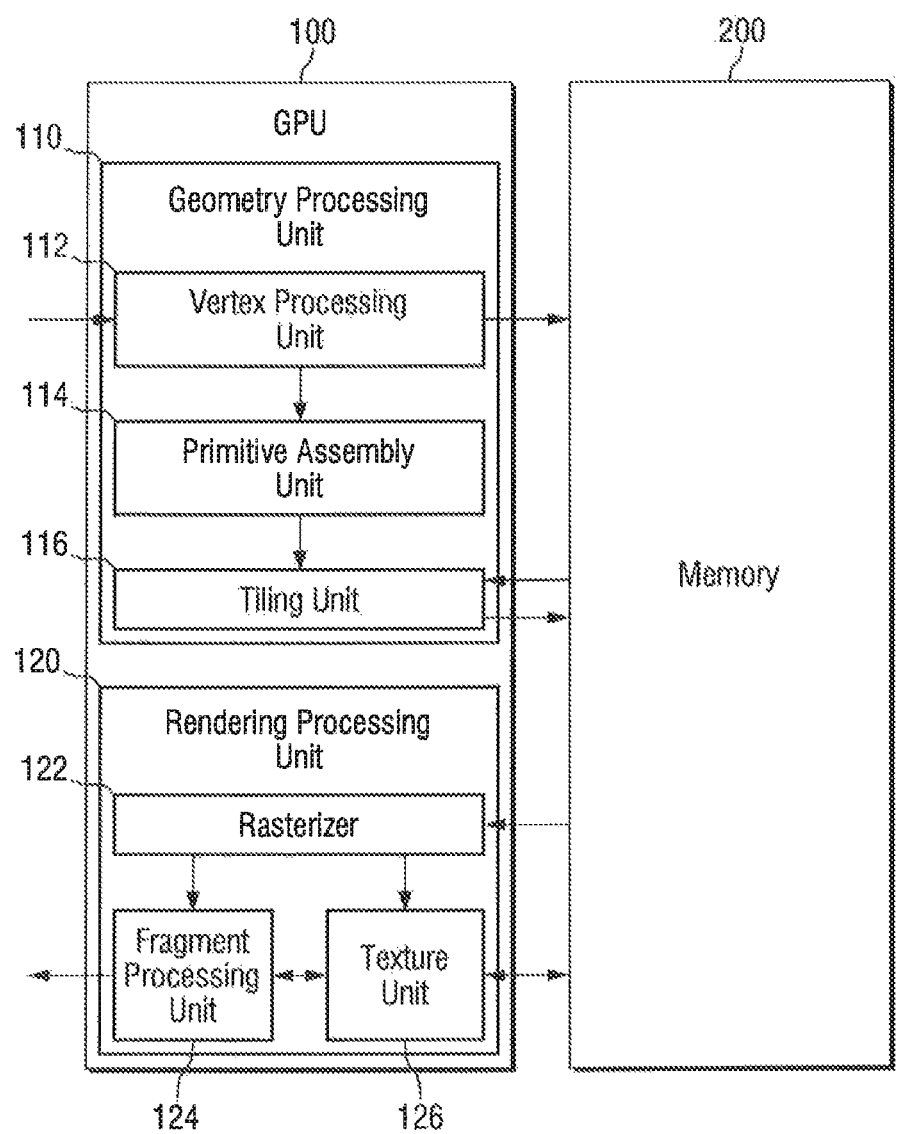
FIG. 2 is a block diagram illustrating a specific configuration example of the graphic processing unit of FIG. 1.

FIG. 2 is a block diagram illustrating a specific configuration example of the graphic processing unit of FIG. 1.

Referring to FIG. 2, the geometry processing unit 110 includes a vertex processing unit 112, a primitive assembly unit 114, and a tiling unit 116. For a better understanding, FIG. 2 illustrates detailed operations of the geometry processing unit 110 and the rendering processing unit 120 relatively minutely using directional arrows, but aspects of the inventive concept are not limited thereto.

When necessary, the detailed operations of various units included in the geometry processing unit 110 and the rendering processing unit 120 may be modified differently from those illustrated herein.

The geometry processing unit 110 can be configured to receive a vertex and to convert the input vertex to then output the converted vertex. Here, the vertex can be provided from a central processing unit (CPU), but aspects of the inventive concept are not limited thereto. For example, the vertex may include properties, such as a position, a normal vector, a color value, and so on, but aspects of the inventive concept are not limited thereto.

The position property of the vertex can be provided in 3D space coordinates. For example, the position property of the vertex may include x, y and z coordinates. The x coordinate may be a horizontal coordinate, the y coordinate may be a vertical coordinate, and the z coordinate may be a depth coordinate. The geometry processing unit 110 can convert an object space vertex into a clip space vertex. The geometry processing unit 110 can convert the object space vertex into a world space vertex, can convert the world space vertex into a camera space vertex and can convert the camera space vertex into the clip space vertex.

The primitive assembly unit 114 can be configured to receive the clip space vertex and to generate and output a primitive. The primitive assembly unit 114 generates and assembles a primitive composed of one or more vertexes. For example, the primitive assembly unit 114 can assemble a triangular primitive composed of three vertexes.

Hereinafter, embodiments of the inventive concept will be described with regard to a triangular primitive, but aspects of the inventive concept are not limited thereto. That is to say, the inventive concept can also be applied to other types of primitives, for example, points, lines, quads, or the like.

The primitive may include a property of connection information. The connection information may represent the order in which vertexes constituting a primitive are connected (for example, in a clockwise direction or a counterclockwise direction). A front face and a back face of the primitive may be distinguished from each other according to the value of connection information.

Meanwhile, in the present embodiment, when the primitive assembly unit 114 assembles primitives, texture patches corresponding to the assembled primitives may be defined. In addition, when the texture patches corresponding to the assembled primitives are defined, information concerning the texture patches may also be generated.

Hereinafter, operations of the primitive assembly unit 114 will be described in more detail with reference to FIGS. 3 and 4.

Figure 3:
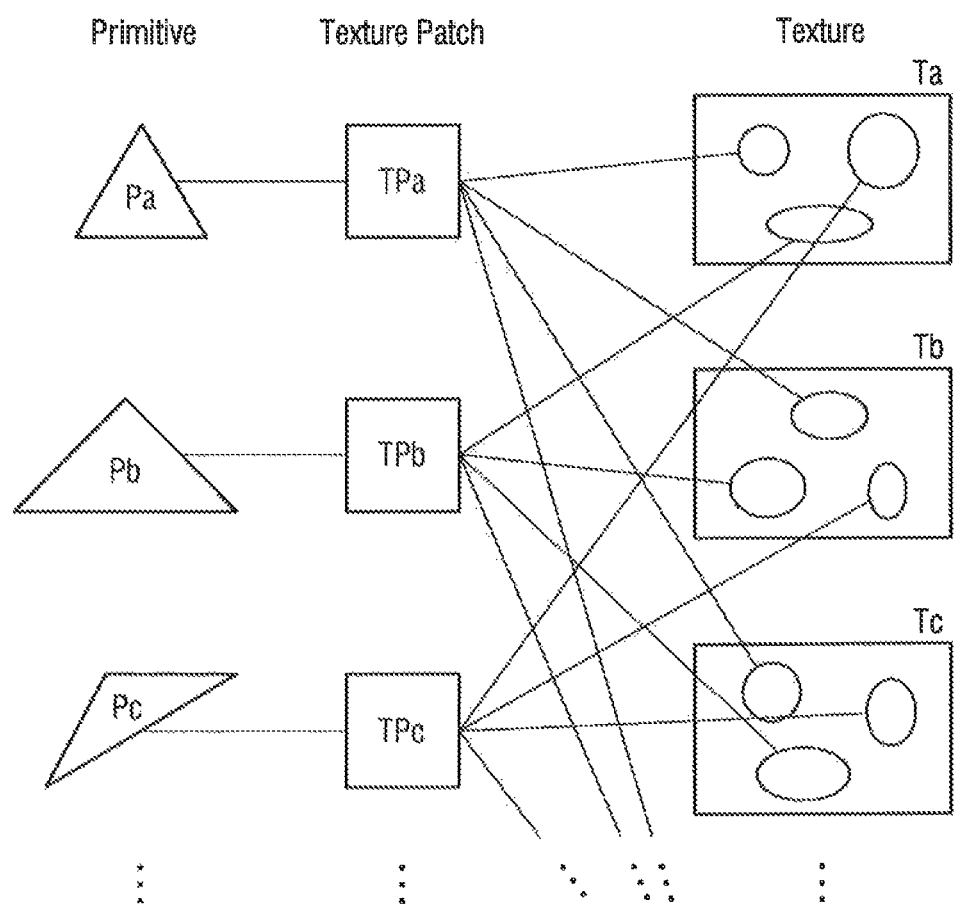
FIGS. 3 and 4 are diagrams illustrating an operation of the primitive assembly unit in the configuration shown in FIG. 2.
Figure 4:
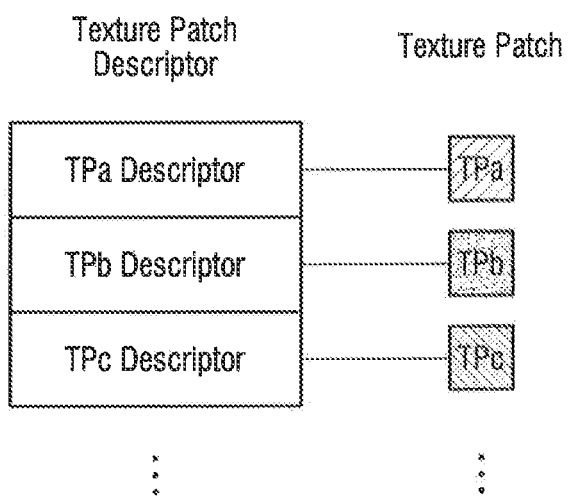

FIGS. 3 and 4 are diagrams illustrating an operation of the primitive assembly unit in the configuration shown in FIG. 2.

First, referring to FIG. 3, when the primitive assembly unit 114 assembles first to third primitives Pa to Pc from the received vertexes, first to third texture patches TPa to TPc corresponding to the first to third primitives Pa to Pc may be defined. Here, the first texture patch TPa may be, for example, a texture footprint corresponding to the first primitive Pa in the first texture Ta stored in the external memory 200. The second texture patch TPb may be, for example, a texture footprint corresponding to the second primitive Pb in the first texture Ta stored in the external memory 200. Finally, the third texture patch TPc may be, for example, a texture footprint corresponding to the third primitive Pc in the first texture Ta stored in the external memory 200. That is to say, the first to third texture patches TPa to TPc corresponding to the first to third primitives Pa to Pc may be defined from the first texture Ta.

Meanwhile, in some embodiments of the inventive concept, a plurality of textures, (e.g., first to third textures Ta to Tc) may be stored in the external memory 200. Here, as shown in FIG. 3, the first to third textures Ta to Tc may correspond to the first to third textures Ta to Tc, respectively. The first texture patch TPa may be a texture footprint corresponding to the first primitive Pa in the first to third textures Ta to Tc, the second texture patch TPb may be a texture footprint corresponding to the second primitive Pb in the first to third textures Ta to Tc, and the third texture patch TPc may be a texture footprint corresponding to the third primitive Pc in the first to third textures Ta to Tc. That is to say, the number of the first to third textures Ta to Tc corresponding to one of the texture patches TPa to TPc may be increased.

Next, referring to FIG. 4, when the texture patches TPa to TPc corresponding to the primitives Pa to Pc are defined, the primitive assembly unit 114 can also generate information about the first to third textures Ta to Tc. In some embodiments of the inventive concept, the information about the first to third textures Ta to Tc may include texture patch descriptors indexing regions of the first to third textures Ta to Tc, where the first to third textures Ta to Tc are defined.

In detail, a first texture patch (TPa) descriptor may index a region of each of the first to third textures Ta to Tc, where the first texture patch TPa is defined, a second texture patch (TPb) descriptor may index a region of each of the first to third textures Ta to Tc, where the second texture patch TPb is defined, and a third texture patch (TPc) descriptor may index a region of each of the first to third textures Ta to Tc, where the third texture patch TPc is defined. The texture patch (TPa to TPc) descriptors may include, for example, start address values, numbers of bytes, offset values, etc., for indexing the corresponding first to third textures Ta to Tc in the first to third textures Ta to Tc, but aspects of the inventive concept are not limited thereto. In some embodiments of the inventive concept, the texture patch (TPa to TPc) descriptors can be stored in the external memory 200.

In the aforementioned embodiment, when the texture patches TPa to TPc corresponding to the primitives Pa to Pc are defined, the primitive assembly unit 114 also generates information about the first to third textures Ta to Tc (for example, the texture patch (TPa to TPc) descriptors) and stores the same in the external memory 200, but aspects of the inventive concept are not limited thereto. When necessary, a time at which the information about the first to third textures Ta to Tc is generated can be advanced or delayed.

Referring again to FIG. 2, the tiling unit 116 can be configured to receive a primitive and to generate and output a primitive list (i.e., a list of primitives).

Hereinafter, the tiling unit 116 according to the embodiment of the inventive concept will be described in detail with reference to FIGS. 5 to 7.

Figure 5:
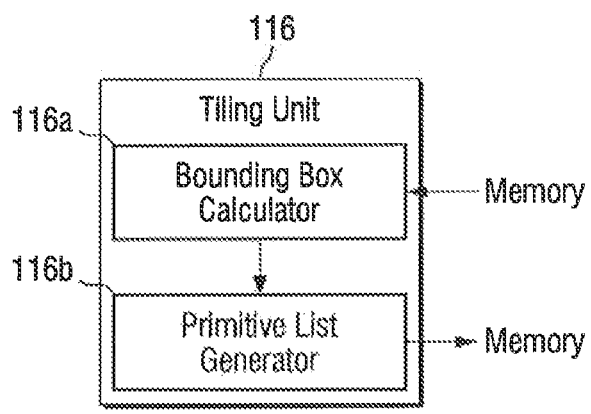
FIG. 5 is a block diagram illustrating a specific exemplary configuration of the tiling unit in the configuration shown in FIG. 2.
Figures 6, 7:
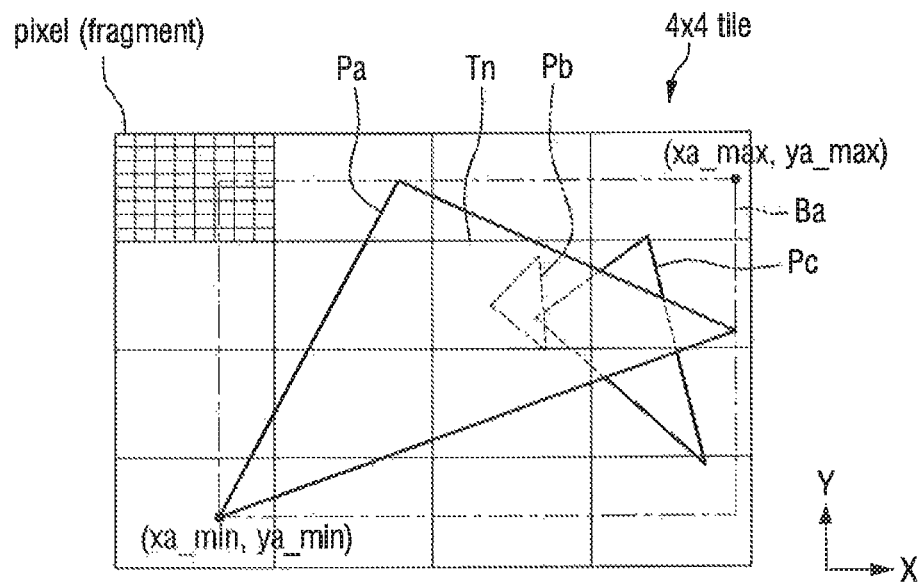
FIG. 6 is a block diagram illustrating a tiling operation of the tiling unit of FIG. 5.
FIG. 7 illustrates an exemplary list of primitives generated by the primitive list generator in the configuration shown in FIG. 5.

FIG. 5 is a block diagram illustrating a specific exemplary configuration of the tiling unit in the configuration shown in FIG. 2, FIG. 6 is a block diagram illustrating a tiling operation of the tiling unit of FIG. 5, and FIG. 7 illustrates an exemplary list of primitives generated by a primitive list generator in the configuration shown in FIG. 5.

Referring first to FIG. 5, a tiling unit 116 includes a bounding box calculator 116a and a primitive list generator 116b.

The tiling unit 116 divides an image frame to be rendered into a plurality of tiles. Each of the plurality of tiles is composed of a plurality of pixels in the image frame. In addition, the tiling unit 116 can further divide each tile into a plurality of sub-tiles.

The tiling unit 116 performs tile binning on the received primitive and can approximatively determine which tile is touched by the primitive. The touching of the tile by the primitive may mean that at least a portion of the primitive belongs to an inside of the corresponding tile. In addition, the tiling unit 116 can allocate the primitive touching the tile to a list of primitives for each tile, as shown in FIG. 7, for example. In the graphics pipeline, rendering is performed on each tile, thereby completing rendering on the overall image frame.

To this end, the bounding box calculator 116a calculates a bounding box forming a boundary of the primitive. In a case of a triangular primitive, for example, the bounding box calculator 116a can calculate the bounding box using the maximum value and the minimum value of x and y coordinates of 3 vertexes constituting the primitive. Meanwhile, in some embodiments of the inventive concept, the bounding box can also be calculated in a 3D manner. Here, the bounding box calculator 116a can calculate a 3D bounding box using x, y and z coordinates of the primitive. In a case of a triangular primitive, for example, the bounding box calculator 116 can calculate the 3D bounding box using the maximum value and the minimum value of x and y coordinates of 3 vertexes constituting the primitive. The calculated bounding box can be configured to perfectly surround the boundary of the primitive. For example, in a first primitive Pa shown in FIG. 6, a bounding box Ba may be defined by the maximum and minimum values among x coordinates of 3 vertexes, respectively, and the maximum and minimum values among y coordinates of 3 vertexes, respectively. The maximum and minimum values of the x and y coordinates defining the first bounding box Ba may be used for tile binning of the first primitive Pa.

For example, in 4×4 tiles shown in FIG. 6, the tiling unit 116 can perform tile binning on the first primitive Pa using the x and y coordinates of the first bounding box Ba. FIG. 6 illustrates a primitive projected on a 2D screen and bounding box. In the embodiment of the inventive concept, for the sake of convenient explanation, the 2D screen is partitioned into 4×4 tiles, but aspects of the inventive concept are not limited thereto.

The tiling unit 116 can determine that a first primitive Pa touches a plurality of tiles, e.g., an nth tile Tn, using maximum values (xa_max, ya_max) and values of x and y coordinates of the first bounding box Ba and may allocate the first primitive Pa to the primitive list of the nth tile Tn. Next, the tiling unit 116 may determine that a second primitive Pb and a third primitive Pc touch the nth tile Tn by the same method as that for the first primitive Pa. The tiling unit 116 may allocate the second primitive Pb and the third primitive Pc to the primitive list of the nth tile Tn.

The primitive list generator 116b generates a primitive list for each tile and outputs the primitive list to the external memory 200. The primitive list output and stored in the external memory 200 can be used by a rasterizer 122 and a texture unit 126, which will be described later. Here, as shown in FIG. 7, the primitive list output to the external memory 200 may include position information for the primitives belonging to the divided tiles, attribute information and texture patch descriptor information.

In some embodiments of the inventive concept, the texture patch descriptor information included in the primitive list may include indexes indexing texture patch descriptors. When the primitive list output by the primitive list generator 116b includes only the indexes indexing the texture patch descriptors, texture patches belonging to the respective tiles can be distinguished while minimizing the overall size of the primitive list. Thus, when the primitive list is stored in the external memory 200, the overhead of the external memory 200 can be reduced.

Meanwhile, when the tiling unit 116 manages the image frame on a sub-tile basis, the tiling unit 116 can generate a primitive list for each sub tile and can output the same to the external memory 200. Here, the primitive list output to the external memory 200 can include position information for the primitives belonging to the divided sub tiles, attribute information and texture patch descriptor information.

Referring again to FIG. 2, the rendering processing unit 120 includes the rasterizer 122, a fragment processing unit 124, and the texture unit 126.

The rasterizer 122 can perform rasterization on each primitive and can convert the primitive into a fragment. The operation of the rasterizer 122 will now be described in more detail with reference to FIG. 8.

Figure 8:
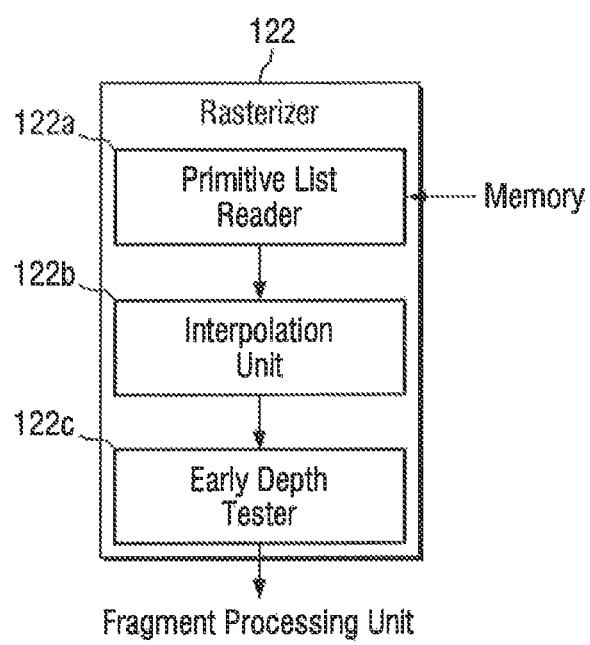
FIG. 8 is a block diagram illustrating a specific exemplary configuration of a rasterizer in the configuration shown in FIG. 2.

FIG. 8 is a block diagram illustrating a specific exemplary configuration of a rasterizer in the configuration shown in FIG. 2.

Referring to FIG. 8, the rasterizer 122 includes a primitive list reader 122a, an interpolation unit 122b and an early depth tester 122c.

The primitive list reader 122a reads the primitive list for each tile from the external memory 200. The primitive list reader 122a may receive the primitives belonging to each tile in a rendering order.

The interpolation unit 122b generates a set of fragments using the primitives received from the primitive list reader 122a. The fragments may indicate 3D dots constituting the inside of the primitives. The respective fragments correspond to the respective pixels of an image frame. Thus, x and y coordinates of the fragments may be aligned on a pixel-grid of a 2D screen. The interpolation unit 122b interpolates values of vertexes constituting the primitives to determine the positions, normal vectors, color values and so on of the fragments. For example, position properties of the fragments may include x, y and z coordinates, which is substantially the same as the position properties of the vertexes. Specifically, the z coordinates of the fragments may indicate depth values.

The early depth tester 122c performs an early depth test in a primitive level for each tile. The early depth test is performed to approximatively determine the visibility of a primitive touching a pertinent tile and to discard data of a primitive completely masked by another primitive and invisible in the pertinent tile of an image frame.

The early depth tester 122c can determine the maximum and minimum depth values of a fragment belonging to the inside of a pertinent tile. The early depth tester 122c can determine the visibility of the fragment by comparing the depth value of the tile with the depth value of the fragment. The maximum and minimum depth values of the pertinent tile, among depth values of the fragments belonging to the inside of the pertinent tile, may be allocated to the maximum and minimum depth values in the rasterization stage. If the maximum depth value of the pertinent tile is greater than that of the pertinent fragment, the early depth tester 122c may determine the pertinent fragment to be an invisible fragment. Meanwhile, if the maximum depth value of the pertinent tile is smaller than that of the pertinent fragment, the early depth tester 122c may determine the pertinent fragment to be a visible fragment.

If the fragment having the maximum depth value of the tile is replaced with a fragment having the same x and y coordinates and a depth value smaller than the maximum depth value of the tile, then the early depth tester 122c updates the depth value of the fragment with the maximum depth value of the tile.

In the example illustrated in FIG. 6, the early depth tester 122c determines visibility of fragments constituting the first primitive Pa for the nth tile Tn and allocates the maximum and minimum depth values, among depth values of the fragments belonging to the inside of the nth tile Tn and constituting the first primitive Pa, to the maximum and minimum depth values of the nth tile Tn. Next, the early depth tester 122c determines the visibility of fragments constituting the third primitive Pc for the nth tile Tn. Since the depth values of the fragments constituting the third primitive Pc are greater than the maximum depth value of the nth tile in, the early depth tester 122c may determine all fragments constituting the third primitive Pc for the nth tile Tn as invisible fragments. Meanwhile, if the visibility of the fragments constituting the third primitive Pc is determined for the nth tile in in the same manner as described above, the early depth tester 122c may determine all fragments constituting the third primitive Pc as invisible fragments. Eventually, the fragments output from the rasterizer 122 are associated with only the first primitive Pa.

Referring again to FIG. 2, the fragment processing unit 124 receives fragments and performs fragment shading, such as hidden surface elimination, lighting, surface shading or texturing, on the received fragments. In some embodiments of the inventive concept, the fragment processing unit 124 may perform additional operations associated with fragment processing as well as the fragment shading.

In the present embodiment, the texture unit 126 may be used in the fragment shading of the fragment processing unit 124. The texture unit 126 may be used in the texturing performed by the fragment processing unit 124, which will now be described in more detail with reference to FIG. 9.

Figure 9:
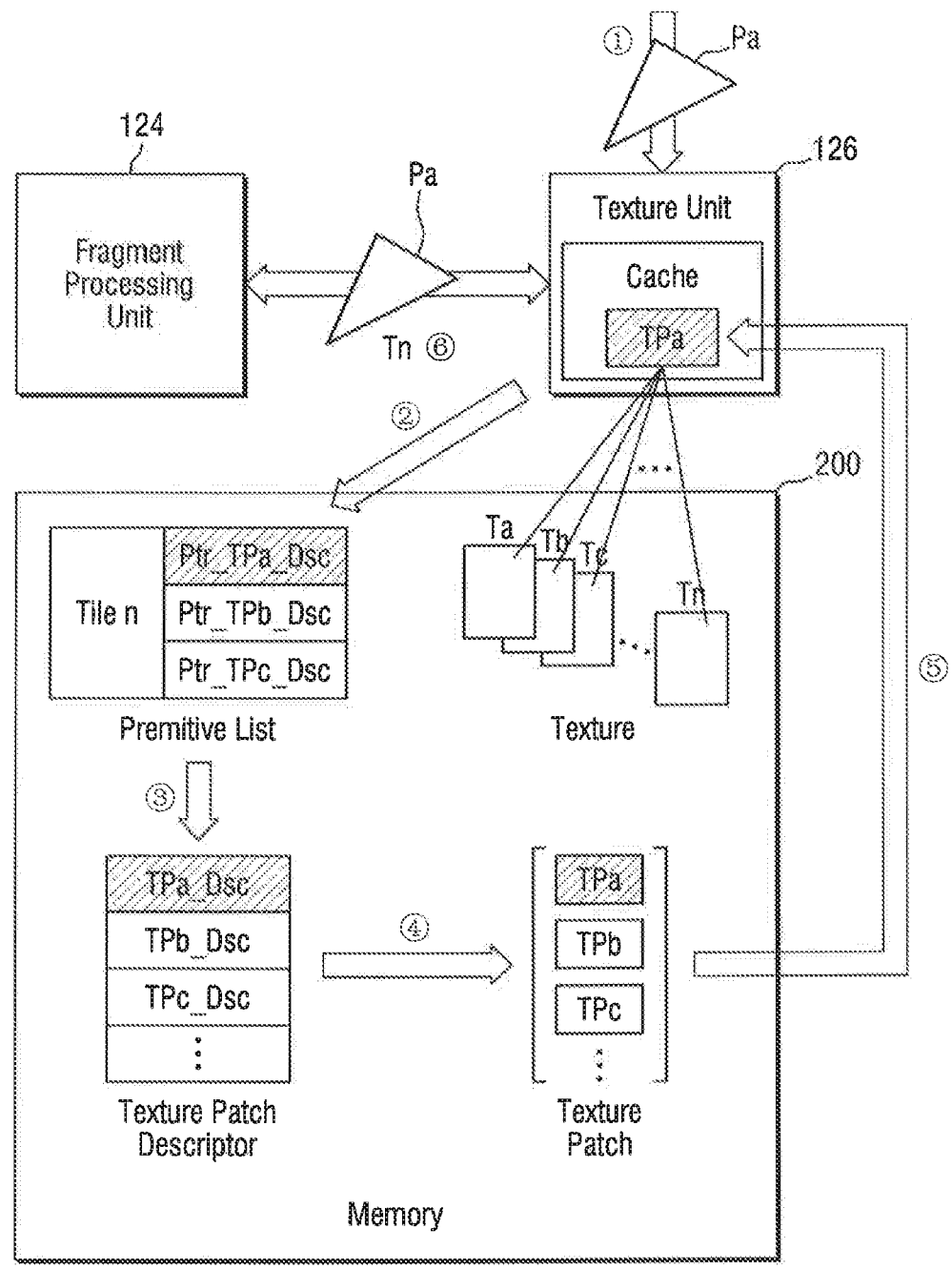
FIG. 9 illustrates an operation of the texture unit in the configuration shown in FIG. 2.

FIG. 9 illustrates an operation of a texture unit shown in FIG. 2. First, as described above, only the fragments belonging to the first primitive Pa are associated with the fragment shading for the nth tile Tn. Therefore, the information is provided to the texture unit 126 from, for example, the early depth tester 122c (①).

The texture unit 126 provided with the information searches for the primitive list stored in the external memory 200 based on the information and acquires the index of the texture patch descriptor corresponding to the first primitive Pa (②).

Next, the texture patch descriptor indexed by the acquired index is searched (③), and the texture patch defined corresponding to the first primitive Pa is acquired (④) The thus acquired texture patch is pre-loaded to, for example, a cache of the texture unit 126 (⑤). Here, the pre-loading of the texture patch to the texture unit 126 means loading the corresponding texture patch to, for example, the cache of the texture unit 126, before making a request for texture information for a target fragment of fragment shading by the texture unit 126 for the purpose of the fragment processing unit 124 performing texturing (⑥).

If the fragment shading is performed on all of the fragments through the above-described procedure, then the fragment processing unit 124 displays the rendered image frame on a frame buffer or a display.

As described above, in the GPU 100 according to the exemplary embodiment of the inventive concept, the corresponding texture patch for each of the assembled primitives is defined in advance in the geometry processing stage, the texture unit 126 included in the rendering processing stage pre-loads the defined texture patch to the cache before the fragment shading is performed. Therefore, when the fragment shading (specifically, texturing) is performed, there is no delay depending on the latency between caches, compared to a case where textures stored in the external memory 200 are searched for using a plurality of caches, the number of unnecessarily repeated searches is greatly reduced. Therefore, processing performance of the GPU 100 can be remarkably improved.

Next, a graphic processing unit according to another embodiment of the inventive concept will be described with reference to FIG. 10. Hereinafter, redundant descriptions of the same functional components as those of the previous exemplary embodiment will be omitted, and the following description will focus on differences between the present and previous embodiments of the inventive concept.

FIG. 10 illustrates an exemplary list of primitives generated by a graphic processing unit according to an exemplary embodiment of the inventive concept.

Referring to FIG. 10, in the graphic processing unit, a primitive list generator (116b of FIG. 5) generates a primitive list for each tile, as shown in FIG. 10, and outputs the generated primitive list to an external memory 200. The primitive list shown in FIG. 10 is different from the primitive list shown in FIG. 7 in that texture patch descriptors, instead of indexes indexing the texture patch descriptors, are included as texture patch descriptor information.

As described above, in a case where the primitive list output by the primitive list generator 116b includes indexes indexing texture patch descriptors, the primitive list may be efficiently used when there are a large number of primitives repeatedly belonging to the respective tiles. However, in a case where there are few or a small number of primitives repeatedly belonging to the respective tiles, index information is additionally generated and acts as the overhead of the external memory 200. Therefore, in the present embodiment, whereas indexes indexing texture patch descriptors are not included in the primitive list output by the primitive list generator 116b, texture patch descriptors are directly included in the primitive list, thereby preventing the overhead from being applied to the external memory 200.

Next, a graphic processing unit according to still an exemplary embodiment of the inventive concept will be described with reference to FIG. 11. Hereinafter, descriptions of the same functional components as those of the previous embodiment will be omitted, and the following description will focus on differences between the present and previous embodiments of the inventive concept.

Figure 11:
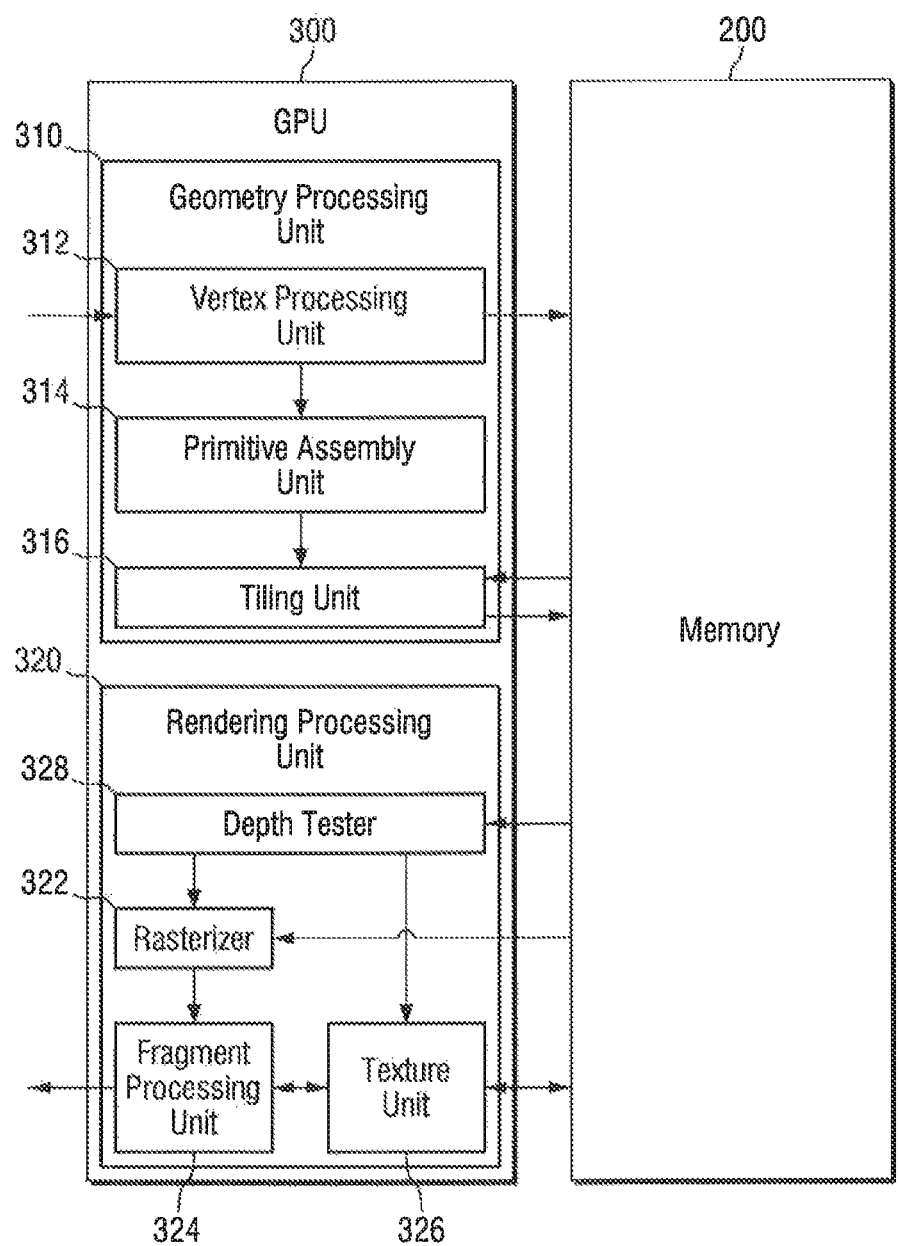
FIG. 11 is a block diagram illustrating a specific exemplary configuration of the graphic processing unit of FIG. 1.

FIG. 11 is a block diagram illustrating a specific exemplary configuration of the graphic processing unit of FIG. 1.

Referring to FIG. 11, in the graphic processing unit 300, a rendering processing unit 320 further includes a depth tester 328 for performing a visibility test on primitives and discarding invisible primitives. In addition, a rasterizer 322 can perform rasterization on outputs of the depth tester 328.

Hereinafter, the operation of the depth tester 328 will be described in more detail with reference to FIGS. 12 and 13.

Figure 12:
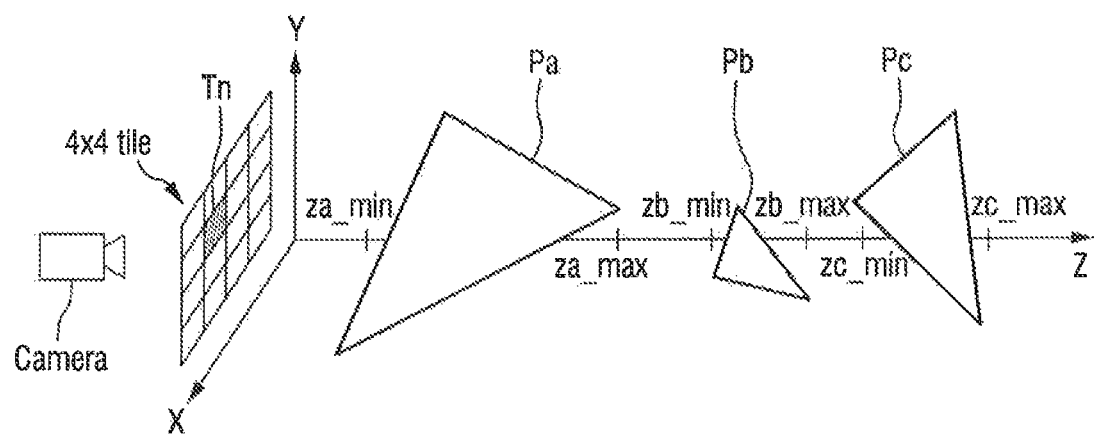
FIGS. 12 and 13 illustrate an operation of the depth tester in the configuration shown in FIG. 11.
Figure 13:
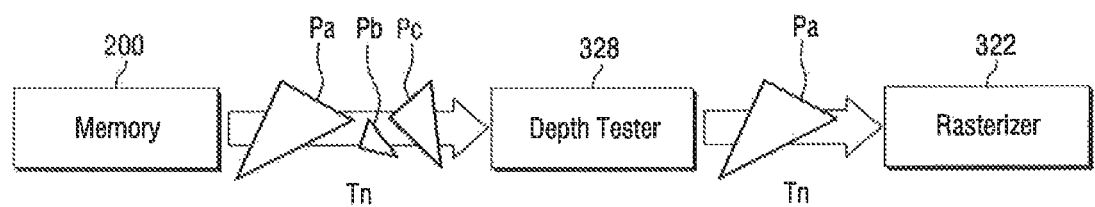

FIGS. 12 and 13 illustrate an operation of a depth tester in the configuration shown in FIG. 11.

In the above-described example shown in FIG. 6, the first to third primitives Pa, Pb and Pc belong to the nth tile Tn. Therefore, the depth tester 328 receives the first to third primitives Pa, Pb and Pc for the nth tile Tn from the external memory 200 and performs a visibility test on the first to third primitives Pa, Pb and Pc, thereby performing a depth test for invisible primitives.

For example, referring to FIG. 12, it is assumed that primitives are input in a rendering order of a third primitive Pc, a second primitive Pb and a first primitive Pa during the depth test for the nth tile Tn. In this case, the depth tester 328 may allocate an ID of the closest primitive to an ID of the third primitive Pc. Subsequently, since the minimum depth value of the second primitive Pb, i.e., zb_min, is smaller than the minimum depth value of the nth tile Tn, that is, the minimum depth value of the third primitive Pc, i.e., zc_min, the depth tester 328 may update the second primitive Pb to a new closest primitive. In addition, since minimum depth value of the third primitive Pc, i.e., zc_min, is greater than the maximum depth value of the nth the Tn, that is, the maximum depth value of the second primitive Pb, i.e., zb, the depth tester 328 may determine that the third primitive Pc in a region of the nth tile Tn is masked by the second primitive Pb. Next, since the minimum depth value of the first primitive Pa, i.e., za_min, is smaller than the minimum depth value of the nth tile Tn, that is, the minimum depth value of the second primitive Pb, i.e., zb_min, the depth tester 328 may update again the first primitive Pa to a new closest primitive. In addition, since the minimum depth value of the second primitive Pb, i.e., zb_min, is greater than the maximum depth value of the nth tile Tn, that is, the maximum depth value of the first primitive Pa, i.e., za_max, the depth tester 328 may determine that the second primitive Pb in the nth tile Tn is masked by the first primitive Pa.

Therefore, as shown in FIG. 13, since (if) the second and third primitives Pb and Pc are masked by the first primitive Pa and invisible, (then) the second and third primitives Ph and Pc are discarded and only the first primitive Pa is proved to the rasterizer 322.

The rasterizer 322 provided with the first primitive Pa in such a manner can perform rasterization on only the first primitive Pa. Thus, whereas the rasterizer 322 performs rasterization on all of the first to third primitives Pa, Pb and Pc in the previous embodiment, the rasterizer 322 performs rasterization on only the first primitive Pa output from the depth tester 328. Additionally, descriptions of a rendering processing unit 312, a primitive assembly unit 314, a tiling unit 316, included in the geometry processing unit 310, and a fragment processing unit 324 and a texture unit 326, included in the rendering processing unit 320, may overlap with those of the previous embodiment, and redundant detailed descriptions thereof will be omitted.

Next, a graphic processing unit according to still another embodiment of the inventive concept will be described with reference to FIG. 14. Hereinafter, redundant descriptions of the same functional components as those of the previous embodiment will be omitted, and the following description will focus on differences between the present and previous embodiments of the inventive concept.

Figure 14:
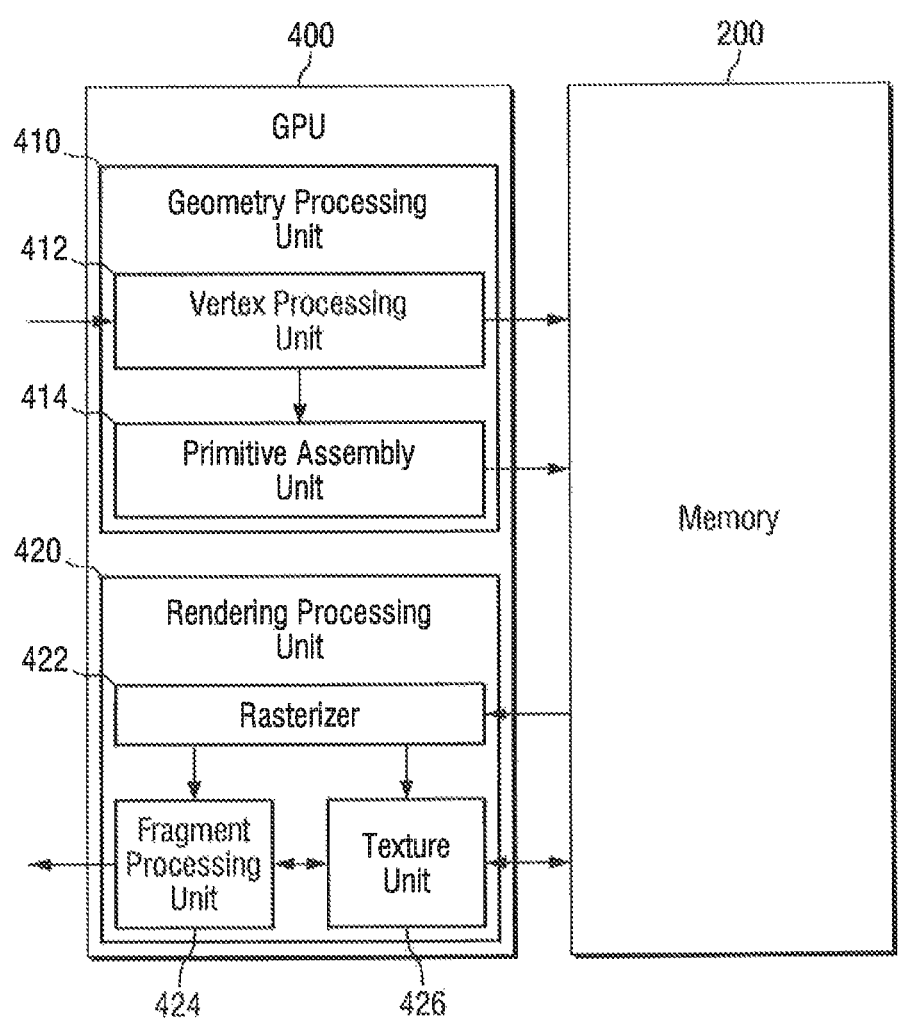
FIG. 14 is a block diagram illustrating a specific exemplary configuration of the graphic processing unit of FIG. 1.

FIG. 14 is a block diagram illustrating a specific exemplary configuration of a graphic processing unit of FIG. 1.

Referring to FIG. 14, in the graphic processing unit 400, a geometry processing unit 410 is not provided with the aforementioned tiling unit (116 of FIG. 2 or 316 of FIG. 13). Thus, this embodiment of the inventive concept is different from the previous embodiments in that primitive-based rendering, instead of tile-based rendering, is performed in the graphic processing unit 400 according to the present embodiment. Therefore, in the present embodiment, a rasterizer 422 performs rasterization on each primitive generated by a primitive assembly unit 414. Additionally, descriptions of a vertex processing unit 412 included in the geometry processing unit 410, and a fragment processing unit 424 and a texture unit 426, included in the rendering processing unit 420, may overlap with those of the previous embodiment, and redundant detailed descriptions thereof will be omitted.

Next, a rendering method according to embodiments of the inventive concept will be described using the specific configuration of a graphics pipeline of the graphic processing units 100, 300 and 400. Redundant detailed descriptions of overlapping content with the aforementioned descriptions will be omitted.

First, a rendering method according to an embodiment of the inventive concept will be described with reference to FIG. 15.

Figure 15:
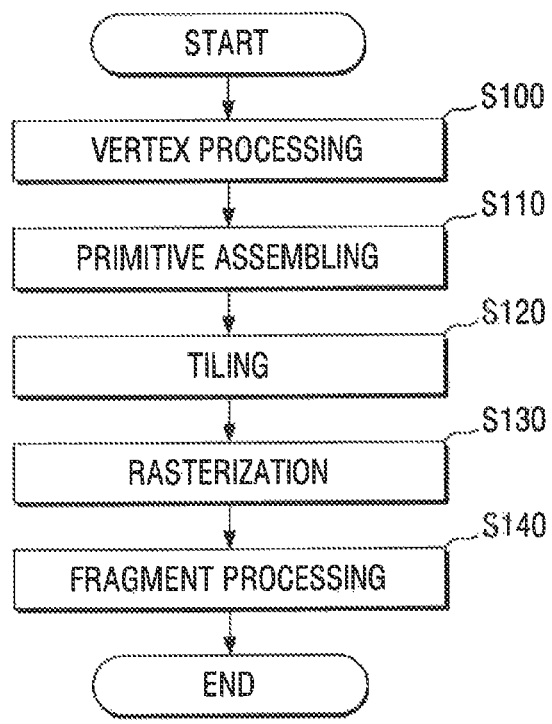
FIG. 15 is a flowchart illustrating a rendering method according to an exemplary embodiment of the inventive concept.

FIG. 15 is a flowchart illustrating a rendering method according to an embodiment of the inventive concept.

Referring to FIG. 15, a vertex is first received from, for example, a. CPU, and the received vertex is converted and output (S100).

Next, a plurality of primitives composed of at least one or more vertexes are assembled (S110). Here, texture patches corresponding to the assembled primitives may be defined. In addition, when the texture patches corresponding to the assembled primitives are defined, information about the texture patches may also be generated. In some embodiments of the inventive concept, the texture patch information may include texture patch descriptors indexing texture patch defined regions in a texture.

Next, the plurality of primitives are tiled in a rendering order (S120). An image frame is divided into a plurality of tiles, the plurality of primitives are tile-binned in the rendering order, and a primitive list is generated for each tile based on the tile binning result. Here, the primitive list for each tile may include one of texture patch descriptors indexing the texture patch defined regions in a texture, and indexes indexing the texture patch descriptors.

Next, rasterization is performed on primitives touching a pertinent tile for each tile (S130). Fragment processing is performed on fragments (S140). Here, fragment processing, including hidden surface elimination, lighting, surface shading or texturing, may be exemplified, and the texture patches defined above may be used in the texturing.

A rendering method according to an exemplary embodiment of the inventive concept will next be described with reference to FIG. 16.

Figure 16:
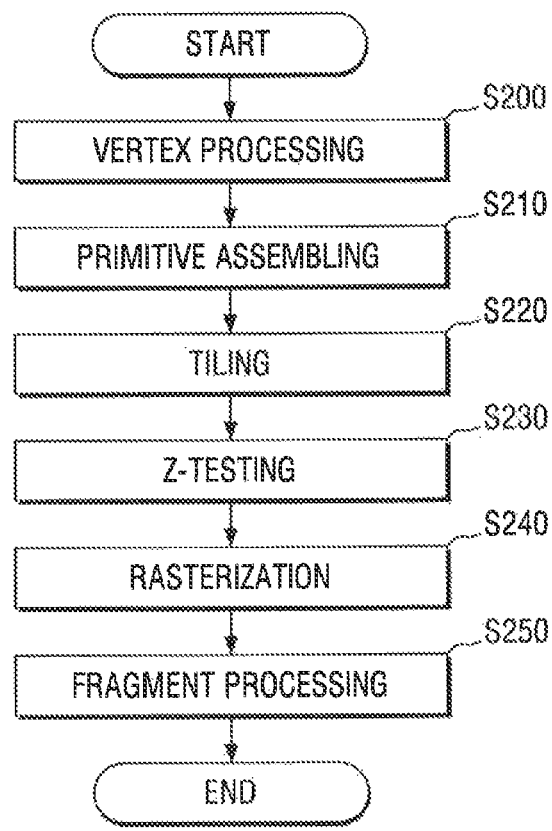
FIG. 16 is a flowchart illustrating a rendering method according to an exemplary embodiment of the inventive concept.

FIG. 16 is a flowchart illustrating a rendering method according to an exemplary embodiment of the inventive concept.

Referring to FIG. 16, a vertex is first received from, for example, a CPU, and the received vertex is converted and output (S200).

Next, a plurality of primitives composed of at least one or more vertexes are assembled (S210). Here, texture patches corresponding to the assembled primitives may be defined. In addition, when the texture patches corresponding to the assembled primitives are defined, information about the texture patches may also be generated. In some embodiments of the inventive concept, the texture patch information may include texture patch descriptors indexing texture patch defined regions in a texture.

Next, the plurality of primitives are tiled in a rendering order (S220). An image frame is divided into a plurality of tiles, the plurality of primitives are tile-binned in the rendering order, and a primitive list is generated for each tile based on the tile binning result. Here, the primitive list for each tile may include one of texture patch descriptors indexing the texture patch defined regions in a texture, and indexes indexing the texture patch descriptors.

Next, a depth test is performed on primitives belonging to each tile (S230). As the result of the depth test, invisible primitives are discarded, Next, rasterization is performed on the primitives having undergone the depth test (S240). Then, fragment processing is performed on fragments (S250). Here, as the fragment processing, fragment shading, including hidden surface elimination, lighting, surface shading, texturing, and so on, may be exemplified. The texture patches defined above may be used in the texturing.

Next, a rendering method according to still an exemplary embodiment of the inventive concept will be described with reference to FIG. 17.

Figure 17:
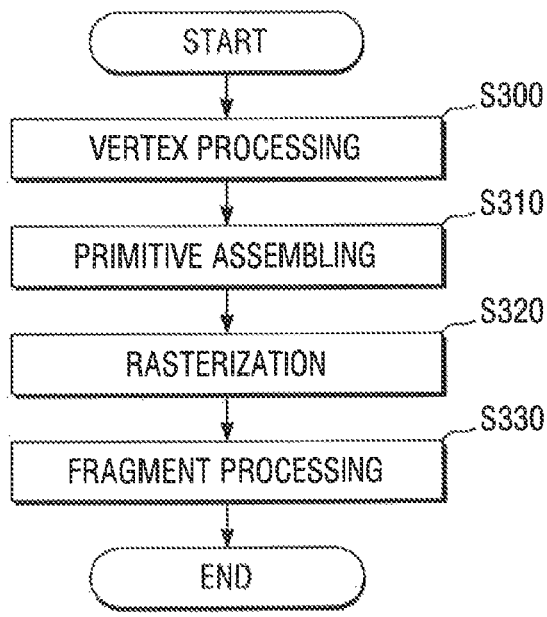
FIG. 17 is a flowchart illustrating a rendering method according to an exemplary embodiment of the inventive concept.

FIG. 17 is a flowchart illustrating a rendering method according to an exemplary embodiment of the inventive concept.

Referring to FIG. 17, a vertex is first received from, for example, a CPU, and the received vertex is converted and output (S300).

Next, a plurality of primitives composed of at least one or more vertexes are assembled (S310). Here, texture patches corresponding to the assembled primitives may be defined. In addition, when the texture patches corresponding to the assembled primitives are defined, information about the texture patches may also be generated. In some embodiments of the inventive concept, the texture patch information may include texture patch descriptors indexing texture patch defined regions in a texture.

Next, rasterization is performed on primitives (S320). Fragment processing is performed on fragments (S330). Here, fragment processing, including hidden surface elimination, lighting, surface shading or texturing, may be exemplified, and the texture patches defined above may be used in the texturing.

As described above, in the rendering methods according to the embodiments of the inventive concept, the corresponding texture patch for each of the assembled primitives is defined in advance in the geometry processing stage to then be used when the fragment shading (specifically, texturing) is performed. Therefore, since the number of unnecessarily repeated searches is greatly reduced in the texturing stage, a rendering speed can be greatly increased.

Figure 18:
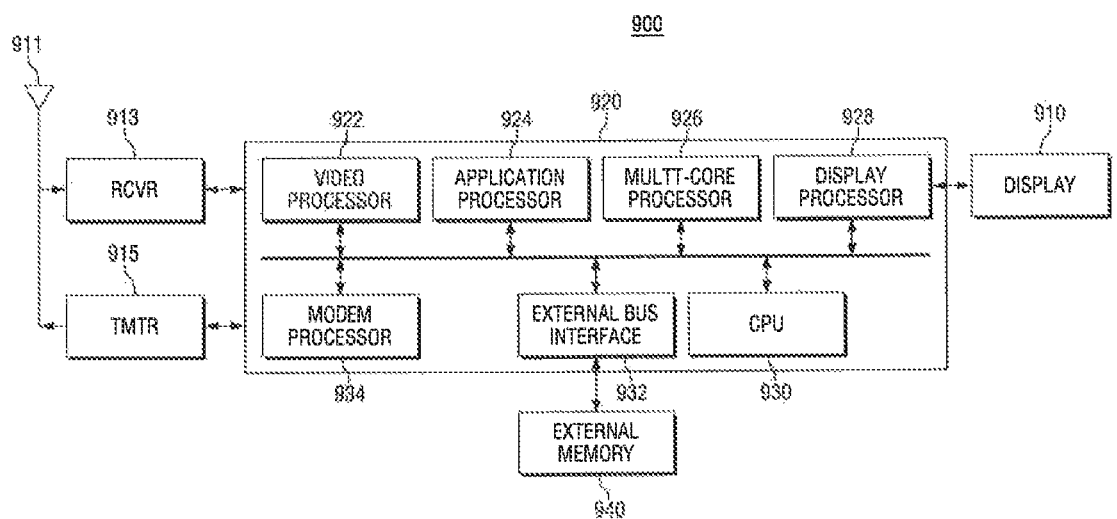
FIG. 18 is a block diagram of a wireless communication device including a graphic processing unit according to some embodiments of the inventive concept.

FIG. 18 is a block diagram of a wireless communication device including a graphic processing unit according to some embodiments of the inventive concept.

Referring to FIG. 18, the device 900 may be a cellular phone, a smart phone terminal, a handset, a personal digital assistant (PDA), a laptop computer, a video game unit, or other devices. The device 900 may use code division multiple access (CDMA), time division multiple access (TDMA) such as a global system for mobile communications (GSM), or other wireless communication standards.

The device 900 may provide bi-directional communication by a receiving path and a transmitting path. Signals transmitted from one or more base stations on the receiving path may be received by an antenna 911 or may be provided to a receiver (RCM) 913. The RCVR 913 can condition and digitalize received signals and provide the conditioned and digitalized signals to a digital section 920 for further processing. On the transmitting path, a transmitter (TMTR) 915 may receive data transmitted from the digital section 920, can process and condition the received data and generate a modulated signal. The modulated signal may be transmitted to one or more base stations through the antenna 911.

The digital section 920 may be implemented by one or more of a digital signal processor (DSP), a microprocessor, reduced instruction set computer (RISC), and the like. In addition, the digital section 920 may be manufactured on one or more of an application specific integrated circuit (ASIC) and other types of integrated circuits (ICs).

The digital section 920 may include, for example, a variety of processing and interface units, such as a modem processor 934, a video processor 922, an application processor 924, a display processor 928, a controller/multi-core processor 926, a CPU 930, and an external bus interface (EBI) 932

The video processor 922 may perform processing of graphic applications, and the graphic processing units 100, 300 and 400 according to the embodiments of the inventive concept may be employed in the processing performed by the video processor 922. In general, the video processor 922 may include an arbitrary number of processing units or modules for an arbitrary set of graphic operations. A particular part or parts of the video processor 922 may be implemented by firmware and/or software. For example, a control part of the video processor 922 may be implemented by firmware and/or software modules (e.g., procedures, functions, etc.) for performing the aforementioned functions. The firmware and/or software codes may be stored in a memory (e.g., the external memory 200 of FIG. 1) or may be executed by a processor (e.g., the multi-core processor 926). The memory may be embodied inside or outside the processor.

The video processor 922 may implement a software interface, such as open graphic library (OpenGL), or Direct3D. The CPU 930 may perform a series of graphic processing operations together with the video processor 922. The controller/multi-core processor 926, including at least two cores, may allocate workloads to be processed by the controller/multi-core processor 926 to the at least two cores and may concurrently process the corresponding workloads.

Figure 19:
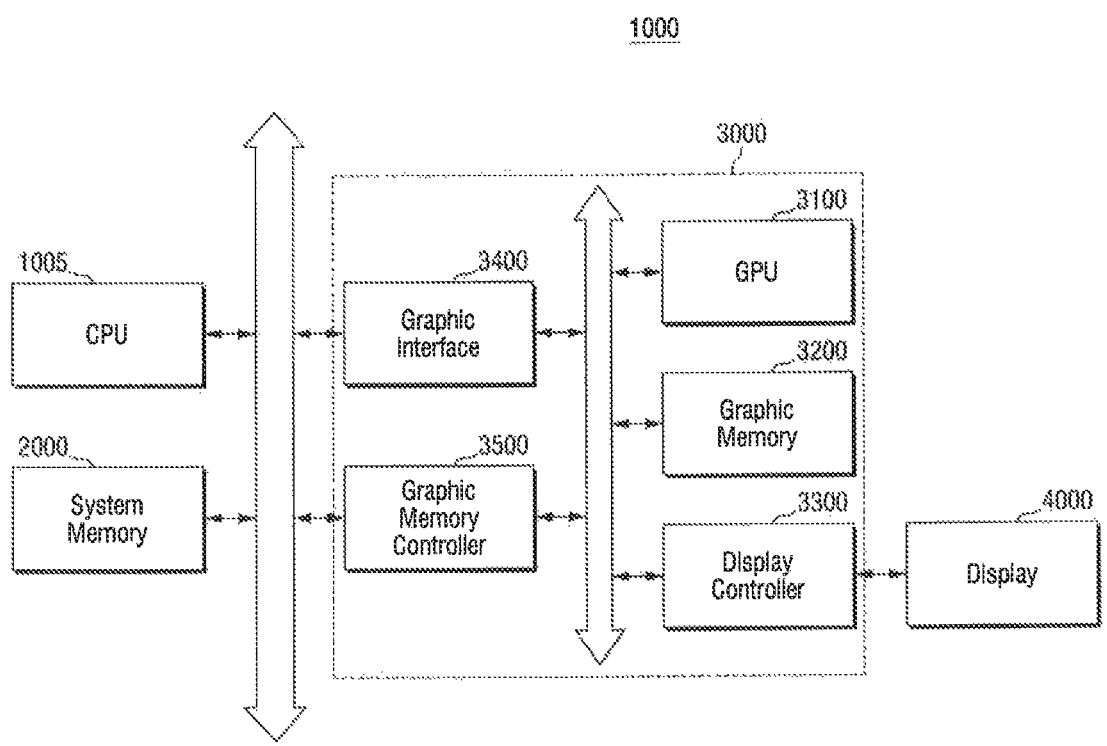
FIG. 19 is a block diagram of a computing system including a graphic processing unit according to embodiments of the inventive concept.

FIG. 19 is a block diagram of a computing system including a graphic processing unit according to embodiments of the inventive concept.

Referring to FIG. 19, the computing system 1000 includes a central processing unit (CPU) 1005, a system memory 2000, a graphic system 3000, and a display 4000.

The CPU 1005 may be configured to drive an graphics application to generate a mesh. The mesh may describe a surface of an object. The mesh may include a plurality of primitives, and each primitive may be composed of one or more vertexes.

The system memory 2000 may be configured to store data. The system memory 2000 may store data processed by the CPU 1005. In addition, the system memory 2000 may function as a working memory of the CPU 1005. The system memory 2000 may include one or more volatile memories, such as a double data rate static DRAM (DDR SDRAM) or a single data rate static DRAM (SDR SDRAM), and/or one or more nonvolatile memories, such as an electrical erasable programmable ROM (EEPROM), or a flash memory.

The graphic system 3000 includes a graphic processing unit (GPU) 3100, a graphic memory 3200, a display controller 3300, a graphic interface 3400, and a graphic memory controller 3500.

The GPU 3100 may have substantially the same configuration as any of the GPUs 100, 300 and 400 according to the aforementioned embodiments of the inventive concept. The GPU 3100 may perform tile-based rendering using a plurality of primitives constituting the mesh. The GPU 3100 receives data of vertexes constituting the mesh from the CPU 1005. The GPU 3100 can assemble the primitive composed of one or more vertexes and perform rendering using the assembled primitive.

The graphic memory 3200 can store graphic data processed by the GPU 3100 or provided to the GPU 3100. In addition, the graphic memory 3200 can function as a working memory of the GPU 3100.

The display controller 3300 controls the display 4000 to display the rendered image frame.

The graphic interface 3400 performs interfacing between the CPU 1005 and the GPU 3100, and the graphic memory controller 3500 provides for memory accessing between the system memory 2000 and the GPU 3100.

Although not shown in FIG. 19, the computing system 1000 may further include one or more input devices, such as buttons, a touch screen, or a microphone, and/or one or more output devices, such as a speakerphone. In addition, the computing system 1000 may further include an interface for exchanging data with respect to an external device in a wired or wireless manner. For example, the interface may include an antenna or a wired/wireless transceiver, and so on.

According to embodiments, the computing system 1000 may be an arbitrary computing system, such as a mobile phone, a smart phone, a personal digital assistant (PDA), a desktop computer, a notebook computer, a tablet computer, or the like.

The steps or actions of the method or algorithm described above in connection with the embodiments of the inventive concept may be embodied directly in hardware, or implemented in a software module executed by a processor, or in a combination of the two. A software module may reside in a random access memory (RAM), a flash memory, a read-only memory (ROM), an erasable programmable read-only memory (EPROM), an electrically erasable programmable read-only memory (EEPROM), a register, a hard disk, a removable disk, a compact disk read-only memory (CD-ROM), or any other form of storage medium known in the art. An exemplary storage medium may be coupled to the processor, such that the processor can read information from, and write information to, the storage medium. Alternatively, the storage medium may be integral to the processor. Further, in some aspects, the processor and the storage medium may reside in an ASIC. Additionally, the ASIC may reside in a user terminal. The processor and the storage medium may reside as discrete components in a user terminal. Additionally, in some aspects, the steps and/or actions of a method or algorithm may reside as one or any combination or set of instructions on a machine readable medium and/or computer readable medium.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A graphic processing unit comprising:
a geometry processing unit configured to receive a first vertex, to output a first primitive and information about a texture patch corresponding to the first primitive using the first vertex, wherein the texture patch corresponding to the first primitive is indexed according to the texture patch information, wherein the texture patch information includes a texture patch descriptor for indexing, to divide an image frame into a plurality of tiles, and to generate a list of primitives corresponding to the divided tiles, wherein indexes index texture patch descriptors corresponding to texture patches corresponding to the primitives in the list of primitives, wherein each of the texture patches is a texture footprint that corresponds to a plurality of textures, and wherein a corresponding texture patch descriptor indexes the plurality of textures; and
a rendering processing unit configured to convert the output first primitive into a first fragment and to perform fragment shading on the first fragment, wherein the texture patch corresponding to the first primitive and indexed by the texture patch information is pre-loaded to the rendering processing unit before the fragment shading is performed.

2. The graphic processing unit of claim 1, wherein the geometry processing unit includes a vertex processing unit configured to receive the first vertex and to convert and output the received first vertex, and
a primitive assembly unit configured to assemble the first primitive from the output of the vertex processing unit and to output the texture patch information defined to correspond to the first primitive.

3. The graphic processing unit of claim 2, wherein the first primitive is a triangular primitive.

4. The graphic processing unit of claim 2, wherein the texture patch descriptors are indexing defined texture patch regions in a texture.

5. The graphic processing unit of claim 4, wherein the texture includes the plurality of textures, and the texture patches are defined in the plurality of textures, respectively.

6. The graphic processing unit of claim 4, wherein the geometry processing unit further includes a tiling unit configured to divide the image frame into the plurality of tiles and to generate the list of primitives corresponding to the divided tiles, wherein the first primitive is among the list of primitives.

7. The graphic processing unit of claim 6, wherein the list of primitives includes position information for the primitives belonging to the divided tiles, attribute information and texture patch descriptor information.

8. The graphic processing unit of claim 7, wherein the texture patch descriptor information includes indexes indexing the texture patch descriptors.

9. The graphic processing unit of claim 8, wherein the texture patch descriptor information further includes indexes indexing the texture patch descriptors corresponding to the primitives belonging to each tile.

10. The graphic processing unit of claim 1, wherein the rendering processing unit includes a rasterizer configured to perform rasterization on an assembled first primitive and to convert the assembled first primitive into the first fragment, a fragment processing unit configured to perform texturing on the first fragment, and a texture unit configured to provide the pre-loaded texture patch to the fragment processing unit to allow the fragment processing unit to perform texturing on the first fragment.

11. The graphic processing unit of claim 10, wherein the texture unit pre-loads the texture patch using the texture patch information.

12. The graphic processing unit of claim 11, wherein the texture patch descriptors are indexing texture patch defined regions in a texture.

13. The graphic processing unit of claim 12, wherein the texture includes the plurality of textures, and the texture patches are defined in the plurality of textures, respectively.

14. The graphic processing unit of claim 10, wherein the rendering processing unit further includes a depth tester configured to perform a visibility test on the assembled first primitive and to discard invisible primitives, and the rasterizer performs rasterization on outputs of the depth tester.

15. The graphic processing unit of claim 1, wherein the texture patch indexed by the texture patch information is pre-loaded to the rendering processing unit before the fragment shading is performed based on receiving information of at least one fragment corresponding to the first primitive.

16. A graphic processing system comprising:
a primitive assembly unit configured to receive a first vertex and to assemble a first primitive using the first vertex;
a tiling unit configured to divide an image frame into a plurality of tiles, to generate information about texture patches corresponding to primitives corresponding to the divided tiles, wherein a texture patch corresponding to the first primitive is indexed according to texture patch information, wherein the texture patch information includes a texture patch descriptor for indexing, and to generate a list of primitives corresponding to the divided tiles, wherein texture patch descriptors are included in the list of primitives and correspond to the primitives corresponding to each tile, wherein indexes index texture patch descriptors corresponding to texture patches corresponding to the primitives in the list of primitives, wherein each of the texture patches is a texture footprint that corresponds to a plurality of textures, and wherein a corresponding texture patch descriptor indexes the plurality of textures; and
a rendering processing unit configured to perform fragment shading using information about the generated texture patches for fragments included in the primitives.

17. The graphic processing system of claim 16, wherein the rendering processing unit includes a depth tester configured to perform a visibility test on the assembled first primitive and to discard invisible primitives, and the fragment shading is performed on outputs of the depth tester.

18. The graphic processing system of claim 16, wherein the texture patch indexed by the texture patch information is pre-loaded to the rendering processing unit before the fragment shading is performed based on receiving information of at least one fragment corresponding to the first primitive.

19. A graphic processing system comprising:
a graphic processing unit configured to perform rendering on an input and to output primitives, to divide an image frame into a plurality of tiles, and to generate a list of primitives corresponding to the divided tiles; and
an external memory used by the graphic processing unit to perform the rendering, wherein texture patches corresponding to the primitives are indexed according to texture patch information, wherein the texture patch information includes a texture patch descriptor for indexing, wherein indexes index texture patch descriptors corresponding to texture patches corresponding to the primitives in the list of primitives, wherein each of the texture patches is a texture footprint that corresponds to a plurality of textures, and wherein a corresponding texture patch descriptor indexes the plurality of textures,
wherein the information about texture patches corresponding to the primitives generated by the graphic processing unit is stored in the external memory, and the texture patches corresponding to the primitives and indexed by the texture patch information are pre-loaded to the graphic processing unit before the graphic processing unit performs fragment shading.

20. The graphic processing system of claim 19, wherein the texture patch descriptors are indexing texture patch defined regions in a texture, and the graphic processing unit pre-loads the texture patches using the texture patch descriptors.

21. The graphic processing system of claim 20, wherein the-list of the primitives belonging to the divided tiles is further stored in the external memory, the list of primitives including position information for the primitives belonging to the divided tiles, attribute information and indexes for the texture patch descriptors, and the texture patches are pre-loaded by the graphic processing unit using the indexes for the texture patch descriptors included in the list of primitives.

* * * * *